United States Patent
Masuda

[19]

[11] Patent Number: 6,101,403
[45] Date of Patent: Aug. 8, 2000

[54] ADAPTER AND SIGNAL TRANSMISSION CABLE FOR MOBILE TELEPHONE

[75] Inventor: Shiro Masuda, Sinohara-Nishi, Japan

[73] Assignee: Cortron Corporation, Taipei, Taiwan

[21] Appl. No.: 08/969,421

[22] Filed: Oct. 21, 1997

[30] Foreign Application Priority Data

Jul. 25, 1997 [JP] Japan ................................... 9-215577

[51] Int. Cl.[7] .................................................. H04Q 7/32
[52] U.S. Cl. .............................. 455/569; 455/88; 455/20; 379/355; 379/390
[58] Field of Search .................................... 379/355, 390, 379/142, 185, 200, 376, 387, 441, 388; 455/20, 88, 569, 41, 99, 142, 345, 133

[56] References Cited

U.S. PATENT DOCUMENTS

| | | | |
|---|---|---|---|
| 4,027,249 | 5/1977 | Calman | 455/88 |
| 4,712,250 | 12/1987 | Michels et al. | 455/20 |
| 4,715,063 | 12/1987 | Haddad et al. | 379/390 |
| 5,561,712 | 10/1996 | Nishihara | 379/355 |

*Primary Examiner*—William Cumming
*Attorney, Agent, or Firm*—Finnegan, Henderson, Farabow, Garrett & Dunner, L.L.P.

[57] ABSTRACT

An adapter and signal transmission cables for hands-free telephone system including a mobile telephone, car audio equipment such as a cassette recorder and a mobile telephone adapter. The mobile telephone adapter includes an adapter body, which can be pushed inside the cassette recorder; a hands-free microphone; a first signal transmission cable for connecting the adapter body and the mobile telephone; and a second signal transmission cable for connecting the hands-free microphone and the mobile telephone. The adapter body has a housing that resembles a cassette tape externally and a magnetic recording head installed inside. One end of the first and second signal transmission cables are joined together and connected to a plug, and the plug is capable of plugging into the voice input/output socket of the mobile telephone. When the mobile telephone picks up incoming voice signals, the signals will be transmitted via the adapter to the cassette recorder, which is then broadcast out through its loudspeakers. Similarly, any out-going voice signals will be collected by the hands-free microphone, and then passed on via the adapter to the mobile telephone for broadcasting. Therefore, a bi-directional communication is established.

7 Claims, 6 Drawing Sheets

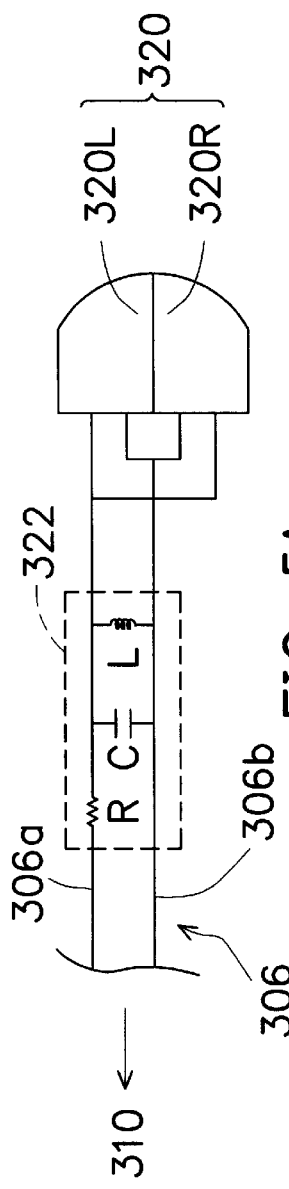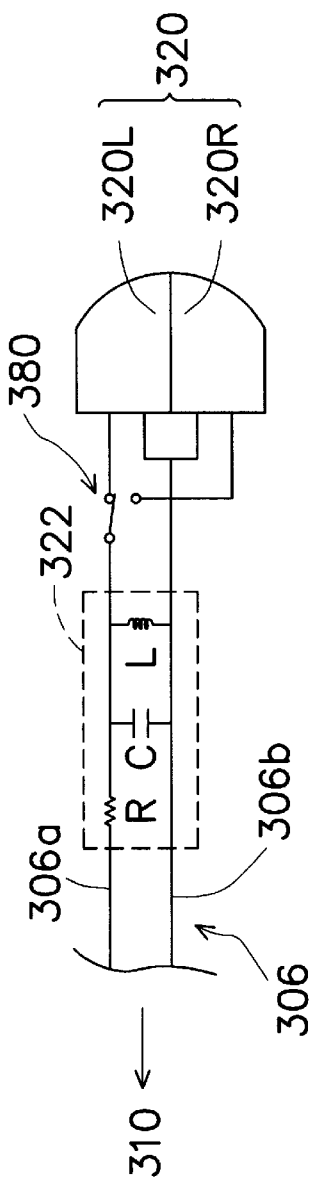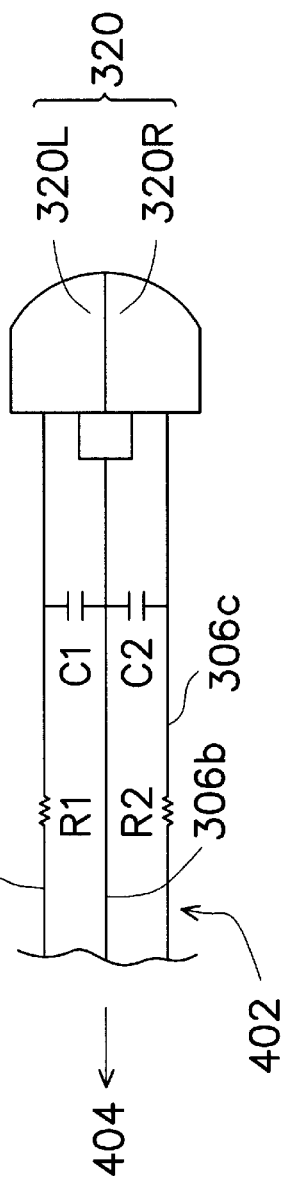

ADAPTER AND SIGNAL TRANSMISSION CABLE FOR MOBILE TELEPHONE

BACKGROUND OF THE INVENTION

1. Field of Invention

The present invention relates to an adapter and related signal transmission cables for converting a mobile telephone into a hands-free telephone system using an automobile sound system.

2. Description of Related Art

In recent years, numerous car accidents have been caused by drivers operating a hand-held telephone while driving. To solve this problem, many new hands-free telephone systems have been developed for car use. These developments are represented by Japanese patents No. 6-252821, No. 7-143051, No. 8-46678, No. 8-125727, No. 8-242275 and No. 9-84131, for example. In all these developments, equipment existing in a car is generally used. For example, car audio and loudspeaker system is used to audibilize received telephone signals.

In general, two methods are commonly used to achieve the required effects. In a first method, which is also described in Japanese Patent No. 8-46678, the car audio system, the mobile telephone and a car adapter are connected together to form a cable system. In a second method, which is disclosed in Japanese Patent No. 9-84131, a microphone is used for receiving the voice of a person in the car and then, the voice signal is transmitted to the mobile telephone through a wireless connection. The system also includes a wireless hands-free module, which is capable of receiving messages from the mobile phone and emitting signals. When the hands-free module receives a voice signal from the mobile phone, the signal will be sent to the loudspeakers of the car audio system.

However, to achieve the hands-free telephone system of the above two methods, sophisticated car adapter equipment must be installed. Therefore, the cost of installation is increased. Moreover, space must be made available in the car interior to house the additional module.

In light of the foregoing, there is a need in the art for a better hands-free car telephone system.

SUMMARY OF THE INVENTION

Accordingly, the present invention is directed to a hands-free mobile car telephone adapter and associated transmission cable system that is simpler to construct and cheaper to produce than existing arrangements. Furthermore, there is no need for the introduction of special equipment that takes up space in the car interior.

To achieve these and other advantages and in accordance with the purpose of the invention, as embodied and broadly described herein, the invention provides an adapter and signal transmission cables for hands-free operation of a mobile telephone. Principally, the adapter system serves two functions. The first function is to carry a remote voice signal received from the voice output terminal of a mobile telephone to an automobile audio system and then output the signal through loudspeakers. The second function is to carry a local voice signal from a microphone to the input terminal of the mobile telephone and then transmit the latter signal via the telephone.

The mobile telephone adapter system includes: an adapter body, which is to be installed in an existing audio device; a hands-free microphone; a first signal transmission cable, which connects the adapter body and the mobile telephone; and a second signal transmission cable, which connects the hands-free microphone and the mobile telephone.

The adapter body includes a housing externally shaped like an audio recording medium to be capable of insertion into the audio device. A magnetic recording head is fixed at a location inside the housing for contact with a magnetic playback head of the audio device. One end of the first signal transmission cable is connected to the magnetic recording head, while the other end is connected to a first terminal for connection with the voice output terminal of the mobile telephone. One end of the second signal transmission cable is connected to the hands-free microphone, while the other end is connected to a second terminal for linking with the voice input terminal of the mobile telephone.

The hands-free communication operates generally as follows. First, the audio device is powered on. Because the adapter body is installed into the audio device, the magnetic recording head of the adapter body will be in contact with the magnetic playback head of the audio device. Since the mobile telephone has an automatic message receiving function, voice from a remote party will be automatically received by the mobile telephone and passed out as a remote voice signal. The remote voice signal will pass through the output terminal of the telephone, the first terminal, the first signal transmission cable, and arrive at the magnetic recording head of the adapter body. The magnetic recording head transmits the received remote voice signal across a gap to the magnetic playback head, and, after passing through the signal processing system of the audio device, the signal is output as audible sound via loudspeakers.

Voice from the mobile phone user is picked up by the hands-free microphone as a local voice signal. The local voice signal passes through the second signal transmission cable, the second terminal and the voice input terminal of the mobile telephone, and then enters the mobile telephone. The mobile telephone then transmits this local voice signal out through an antenna. Hence, a hands-free two-way telecommunication is established.

According to one preferred embodiment of this invention, existing audio systems and loudspeakers can be utilized to handle the hands-free telecommunication. Moreover, the adapter body for connecting with the mobile telephone can be fabricated into a shape similar to the recording medium used by the audio device, and so the adapter can be easily inserted into the audio device. Therefore, aside from the audio device and associated system, no additional space is required to house additional equipment other than the mobile telephone, the hands-free microphone, and the first and second signal transmission cables. Furthermore, using the existing audio equipment has several advantages, including better sound quality, adjustable sound volume, and better noise control even in an intrinsically noisy environment like the car interior.

The voice input/output terminals of a mobile telephone are constructed to include a common ground wire and a voice input/output socket having connection with the voice input and voice output terminals. First and second adapter terminals are located on a plug insertable into the voice input/output socket of the mobile telephone, and the first and second signal transmission cables extend from the plug.

Because most mobile telephones contain a voice input/output socket, connecting the adapter to a mobile telephone is a simple matter. It is necessary only to plug the adapter plug into the voice input/output socket. Furthermore, for easy plug-in, both the first and the second signal transmission cables end at the same plug. Hence, the adapter body and the hands-free microphone are integrated as a unit.

Along the first signal transmission cable, a bandpass filter capable of filtering voice frequencies can be installed to filter the remote voice signal. Through the bandpass filter, high and low frequencies present in a voice sound spectrum are cut off, leaving frequencies within the range 2 to 8 KHz, for example. Thus, unwanted high and low frequency signals are omitted so that a high quality communication is obtained. The magnetic playback head of the audio equipment is a dual magnetic head capable of outputting stereo sound. Therefore, a monaural remote voice signal can be played out as long as the magnetic recording head inside the adapter housing is in communication with either side of the dual magnetic head. The audio device is part of an audio system; therefore, it has a dual magnetic head for playing stereo sound. However, the remote voice signal is monaural. Hence, as long as the remote voice signal is transmitted to any one side of the dual magnetic head, voice sound can be heard at both the left and the right loudspeakers.

The magnetic recording head can also be a dual magnetic head similar to the dual magnetic head of the audio device. To operate this second dual magnetic head, an operational device can be installed on the housing or the hands-free microphone. Together with a connecting switch, a signal that comes from the first signal transmission cable can be made to change over and be transmitted to either side of the second dual magnetic head. Similarly, through an operational link with the operational device, sound can be output selectively from the left or the right loudspeaker. If the steering wheel is on the right side of the car, it is preferred to play the remote party's voice from the right loudspeaker. Local voice signals to be transmitted to the remote party are picked up by the microphone installed next to the driver's seat, and those signals are sent out to the remote party via the same route. Under such circumstances, there will be less switching of the operational device to play voice signals from the left loudspeaker.

For a mobile telephone that has a voice input/output socket, the remote voice signal received will pass through the voice input/output socket, be amplified by the audio device and then output as sound through the loudspeakers. On the other hand, the local voice signal will be input to the mobile telephone through the voice input/output socket. The local voice signal is transmitted to the mobile telephone through a mobile telephone adapter that is capable of signal transmission. The adapter includes an adapter body capable of being inserted into the audio device, and signal transmission cables for connecting the mobile telephone and the adapter body. The adapter body includes a housing, which is shaped into a form similar to an audio recording medium used by the audio device. Inside the housing and at a location opposite the magnetic playback head of the audio device, a magnetic recording head is installed. Connected to the adapter body is a signal relaying transmission cable that transmits the remote voice signal to the magnetic recording head. At the other end of the signal relaying transmission cable, there is a first plug. Signal transmission cables for the adapter system includes a hands-free microphone, a first signal transmission cable for connecting the adapter body and the mobile telephone, and a second signal transmission cable for connecting the hands-free microphone and the mobile telephone. One end of the first signal transmission cable has a relaying socket for receiving the first plug. The other end of the first and second signal transmission cables are joined together and connected to a second plug, which is capable of plugging into the voice input/output socket of the mobile telephone.

The adapter body and signal transmission cables for the adapter are separable. Therefore, when the adapter body is pushed inside the slot for receiving the first recording medium (cassette tape) of the original audio device (for example, the cassette deck), and the first plug of the adapter body is plugged into the signal output socket of an audio equipment for playing a second recording medium (for example, a compact disk or a mini disk), audio signals from the second recording medium can be transmitted to the loudspeakers through the audio device. Alternately, the first plug can be plugged into the relaying socket when the mobile telephone needs to be used. The arrangement here ensures full utilization of the adapter body because besides connecting to a mobile telephone, the adapter body can be used for other audio equipment. In other words, with minor addition of signal transmission components to the adapter system, other audio equipment can also be used. Hence, the product value of the adapter system is greatly increased.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIGS. 5A through 5C are circuit diagrams of the circuits inside the main body of the adapter;

DESCRIPTION OF THE PREFERRED EMBODIMENTS

Figure 1:
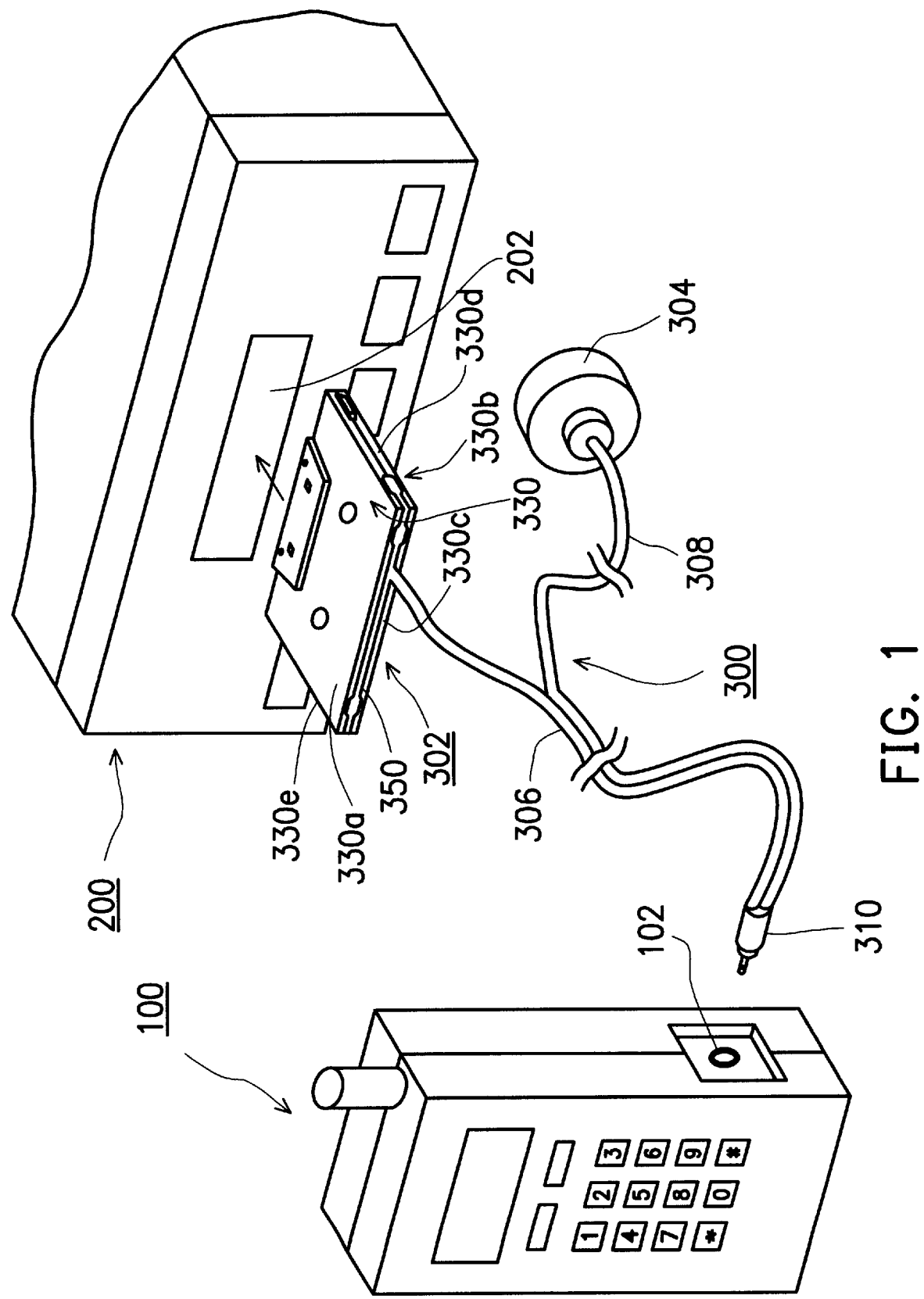
FIG. 1 is a three-dimensional sketch of a hands-free car telephone system according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

As shown in FIG. 1, a hands-free car telephone system in accordance with one embodiment of the invention includes a mobile telephone 100, a car audio unit such as a cassette recorder 200 and a mobile telephone adapter system 300. The mobile telephone 100 has a three-terminal voice input/output socket 102. The three terminals of the socket 102 include a voice output terminal, a voice input terminal and common ground terminal. The cassette recorder 200 includes a cassette slot that has a dust cover.

The mobile telephone adapter system 300 includes an adapter body 302 that is capable of sliding into the cassette deck of the cassette recorder 200 through the cassette slot, a hands-free microphone 304, a first signal transmission cable 306 connected at one end to the adapter main body 302, a second signal transmission cable 308 connected at one end to the hands-free microphone 304, and a plug 310 connected to the other ends of the first and second signal transmission cables. The plug 310 is capable of plugging into the voice input/output socket 102 of the mobile telephone 100.

Figure 2:
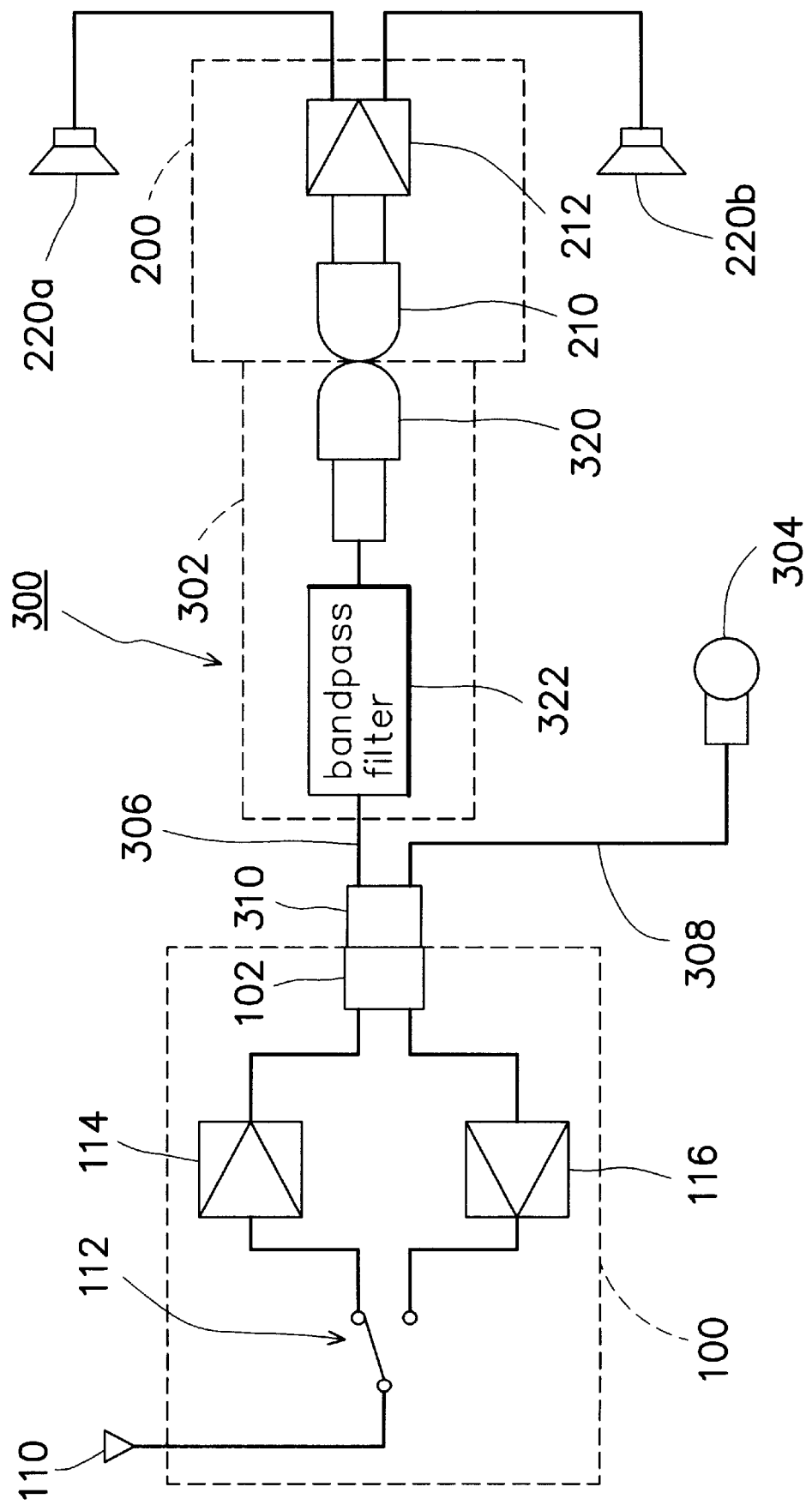
FIG. 2 is a block diagram of the electric circuit of the telephone system as shown in FIG. 1.

A block diagram of the electric circuit of the telephone system of this invention is shown in FIG. 2. The mobile telephone 100 is capable of receiving a remote voice signal from the antenna 110 and sending out a local voice signal. A switch 112 serves as a two-way switching station for receiving the remote signal and emitting the local signal. The remote voice signal coming from the antenna 110 passes through the switch 112 into an amplifier 114 to be amplified. On the other hand, the local voice signal coming from the hands-free microphone 304 passes through the second signal transmission cable 308, the plug 310 and the voice input/output socket 102 into the mobile telephone 100. The local voice signal is amplified by an amplifier 116, then passed on through the switch 112 and is finally emitted by the antenna 110.

Through the voice input/output socket 102 of the mobile telephone 100, the remote voice signal passes from the plug 310 via the first signal transmission cable 306 to the adapter main body 302. As shown in FIG. 2, the main body of the adapter 302 houses a magnetic recording head 320 and a band-pass filter 322. The bandpass filter 322 allows frequencies within the range of 2 to 8 KHz to pass, while higher and lower frequency noises will be cut off. Therefore, any low frequency noise produced by wind, for example, or any high frequency inaudible noises will be completely cut off.

In FIG. 5A, the first signal transmission cable 306 comprises a remote voice signal line 306a and an ground line 306b. The first signal transmission cable 306 is a coaxial cable constructed with a central ground line 306b wrapped by a shielding net. The coaxial cable constitutes the first voice signal line 306a. Similarly, the second signal transmission cable 308 is made from the same type of coaxial cable. The bandpass filter 322 is formed by connecting a resistor R in series with the remote voice signal line 306a, and connecting a capacitor C and an inductor coil L in parallel between the first voice signal line 306a and the ground line 306b.

In the embodiment shown in FIG. 5A, the magnetic recording head 320 has a dual magnetic head 320R and 320L for stereo sound production. To make the remote voice signal monaural, the magnetic head on the L or R side can be used. In this embodiment, both the L and the R side channels are used.

Figure 3:
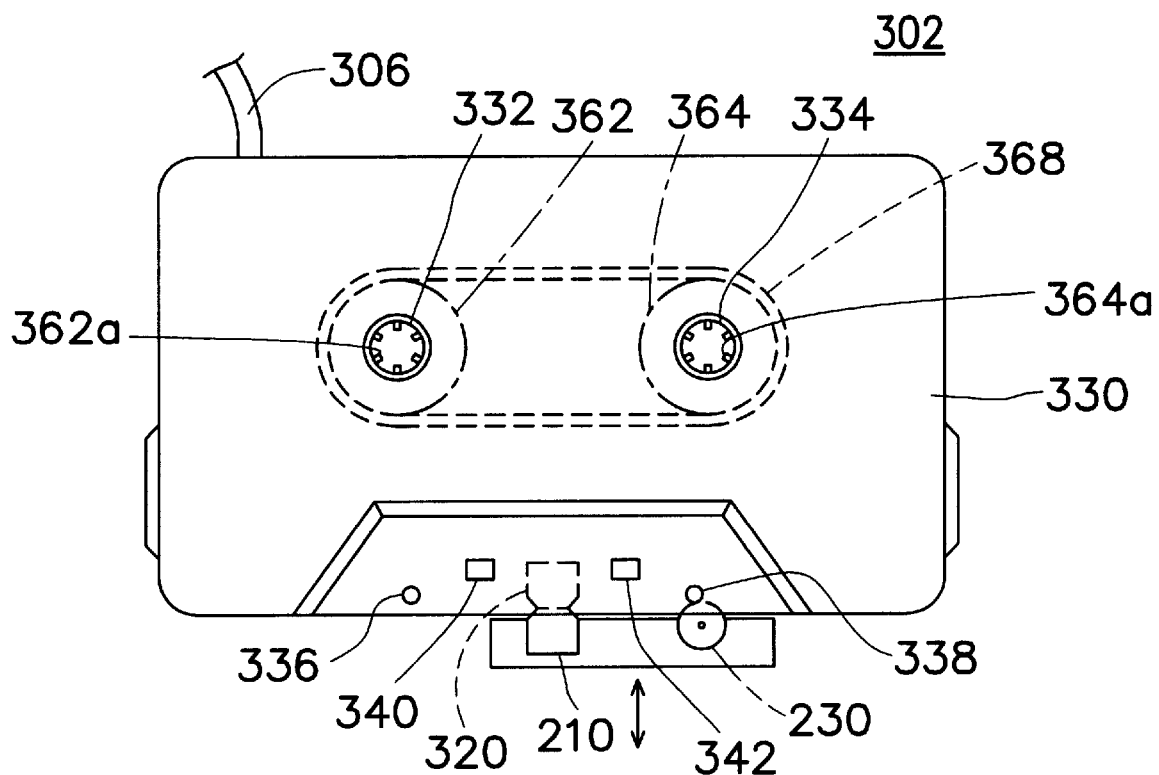
FIG. 3 is a planar sketch of main body of the adapter shown in FIG. 1 and to be installed inside a car audio cassette system.

Location of the magnetic recording head 320 within the adapter body 302 is shown in FIG. 3. When the adapter 302 is inserted into the cassette deck of the cassette recorder 200, the magnetic recording head 320 will be in contact with a magnetic playback head 210. Therefore, the remote voice signal can be transmitted from the magnetic recording head 320 to the magnetic playback head 210 of the cassette recorder.

As soon as the magnetic playback head 210 receives the remote voice signal, the signal is amplified by a third amplifier 212. This amplified remote voice signal is transmitted through the car stereo system, and then output from the left and right loudspeakers 220a and 220b, respectively. The magnetic playback head 210 in FIG. 2 is only a portion of the signal shaping system because only the amplifier 212 is shown. In fact, most car audio systems are capable of performing the required signal shaping before outputting sound from the loudspeakers.

The purpose of a hands-free communication system is to enable people to talk to each other while they are engaged in some other activities. To achieve this, signals must be registered automatically. In the past, two automatic reception methods have been suggested. The first method is to pre-assign an automatic message receiving mode, in which the number of dialing tones occur before the automatic pick-up system take-action mode is set. If no other action is taken before the end of the pre-set number of dialing tones, the mobile telephone 100 will automatically pick up the telephone to receive the message. The second method makes use of the "any key answer" function of the telephone. If any keys on the mobile phone other than "the power cut-off key" are pressed, the mobile telephone will automatically perform the sequence for message receiving. Another feature preferably incorporated in a mobile telephone is an automatic cut-off function, so that after the one of the parties has finished talking for about 2 to 6 seconds, the telephone system will be shut down automatically.

According to this embodiment, there is no need for picking up and holding the mobile telephone 100 both for signal receiving and other actions thereafter. The user can talk through the hands-free microphone 304 and listen to the other party through the speakers 220a and 220b already installed in the car interior.

Figure 4:
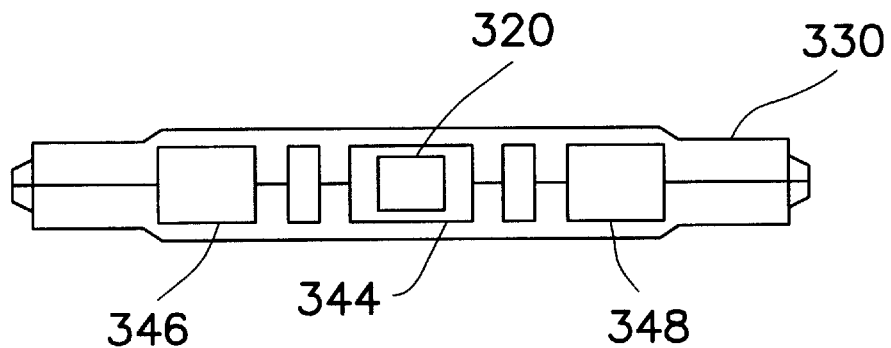
FIG. 4 is a front view of the main body of the adapter as shown in FIG. 1.

The adapter body 302 has a structure similar to the cassette adapter as disclosed in Japanese Patent No. 62-120688. As shown in FIGS. 1, 3 and 4, the adapter 302 has a plastic housing 330 shaped very much like a cassette tape. The housing 330 includes an outer surface 330a that leads into an inner surface 330b (as shown in FIG. 1), reel openings 332 and 334, capstan openings 336 and 338, and guide pin openings 340 and 342 (as shown in FIG. 3). Additionally, because contact needs to be made with the magnetic recording head 320 in the front face of the adapter 302, a magnetic head opening 344 and two pinch roller openings 346 and 348 (as shown in FIG. 4) are formed there. In FIG. 3, only one pinch roller 230, that passes through the pinch roller opening 348, is shown to press against the capstan. However, for an auto reverse cassette recorder, pinch rollers will be seen to pass through openings 346 and 348 for forward and backward driving actions, respectively.

The housing 330 has a structural design that differs slightly from an ordinary cassette tape. As shown in FIG. 1, in the back side 330c and two flanking sides 330d and 330e, the housing 330 has a slit 350, which enables the first signal transmission cable 306 to pass out from the adapter. Since the cassette recorder, as shown in FIG. 1, is of the front loading type, only a backside slit 330c is required in the housing 330 of the adapter 302. However, if a cassette recorder different from the one shown in FIG. 1 is used, for example, a side loading type, then the first signal transmission cable 306 is arranged to pass out from one of the sides 330d or 330e. In this embodiment, any of these modes are accommodated since the slit 350 extends throughout the back side 330c and each of the sides 330d and 330e, respectively.

In addition, if the adapter 320 is used in an auto reverse tape recorder, a mechanism is provided for preventing auto reverse actions, as shown in FIG. 3. The inner rim of the adapter 302 has hubs 362a and 364a each having inward directed protrusions. These hubs allow the reels 362 and 364 free to rotate. At the outer periphery of these two reels, there is a magnetic belt 368 encircling the reels. With this construction, when torque is applied to one of the reel axis, the torque will be transmitted to one of the other hubs 362a or 364a. Consequently, the torque will also drive one of the other reels 362 or 364 via belt 368, and making it rotate as well. With this arrangement, once the driver side reel stops rotating, the reverse timing can be immediately sensed to prevent automatic reverse.

Figure 6:
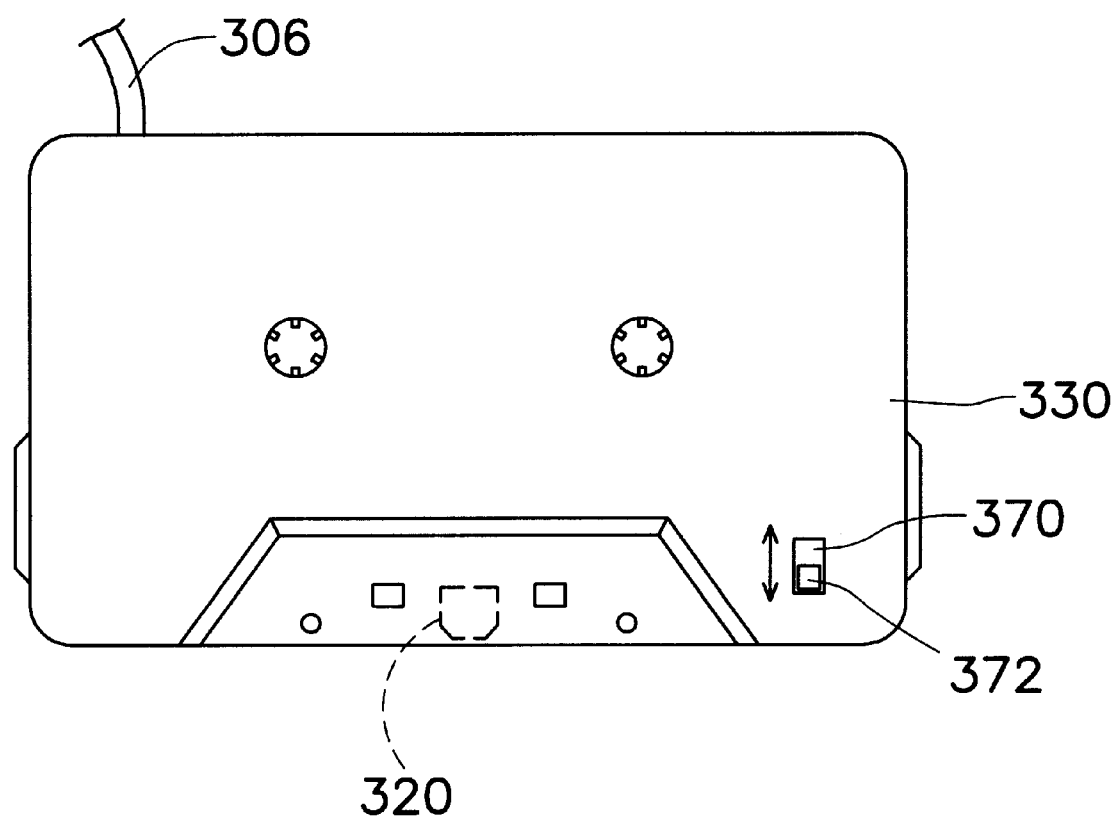
FIG. 6 is a planar sketch of the main body of the adapter including a mechanical changeover switch for loudspeakers in another preferred embodiment of this invention.

FIG. 5B and FIG. 6 show variations of the basic adapter. As shown in FIG. 5B, the remote voice signal that passes through the bandpass filter 322 is transmitted to one of the two magnetic heads 320R or 320L via a two way switch 380. Utilizing the above switching capabilities, voice from the remote party can be redirected to the left or the right magnetic heads and hence can be output to the left or the right side speaker.

The two-way switching of a changeover switch 380 can be effected either electronically through an operational device on the microphone 304, or mechanically as shown in FIG. 6. In FIG. 6, the housing 330 of the adapter main body 302 has a recess opening 370, and in that opening, there is an operational device 372. By moving the changeover switch 380 up or down as indicated by the arrow, appropriate redirection can be obtained.

The ability to provide a left/right exchange of the incoming voice from the other party to different loudspeakers has some advantages. Since the hands-free microphone 304 is installed next to the driver's car seat and the driver's seat for a Japanese car, for example, is on the left side, listening to the voice from the remote party through the right loudspeaker is satisfactory. However, reproducing the voice from the left loudspeaker is preferred for Japanese cars. As shown in FIG. 5B, the left magnetic head 320L can be connected to the first voice signal line 306a. If the adapter body 302 is turned upside down and pushed into the cassette deck, the right loudspeaker can be used. Hence, there is no need to insert the adapter 320 into the cassette deck in a specific top-bottom direction. Furthermore, with the help of a changeover switch 372, the operation can be made much simpler and more easily understood. This applies equally well to cars where the steering wheel is on the left side.

The selection of loudspeakers can be achieved even for the system in FIG. 5A. Since the remote voice signals are transmitted to both the left and the right channels, the audio control system of the car can be utilized to select output from either of the loudspeakers. In addition, the volume control knob of the audio system can be used to control the loudness of the voice.

Figure 7:
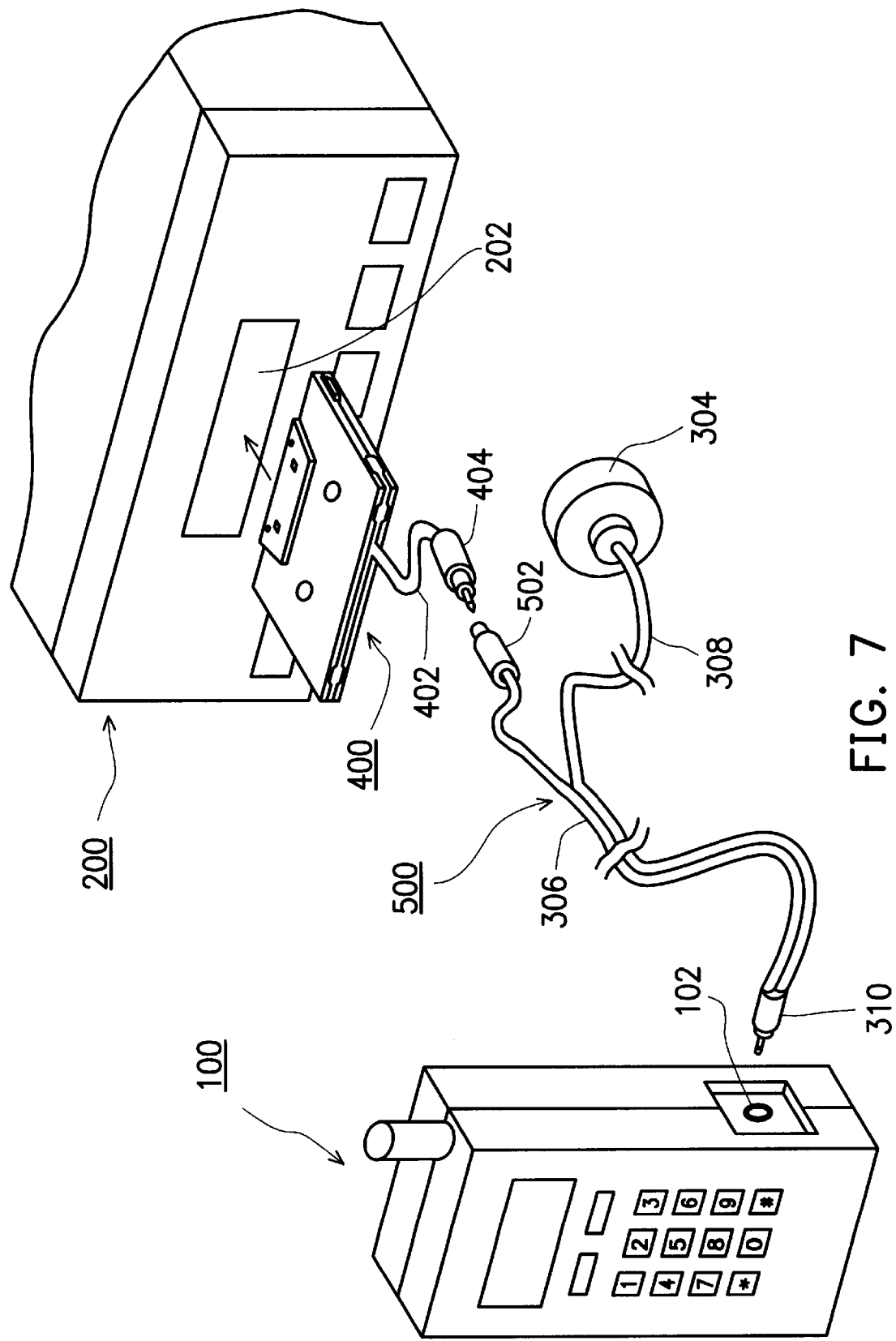
FIG. 7 is a three-dimensional sketch of a hands-free telephone system according to another preferred embodiment of this invention.

FIG. 7 shows another preferred embodiment of the hands-free telephone system. First, a relaying signal transmission cable 402 with one end connected to a first plug 404 is extended from the adapter body 400. The adapter 400 does not form a single piece with the first signal transmission cable 306. In addition to the adapter body 400, the system also has an independent transmission cable 500 for the adapter. This transmission cable 500 comprises a first signal transmission cable 306 and a second signal transmission cable 308. Cables 306 and 308 have one of their ends joined together and connected to a second plug 310. The other end of cable 306 is connected to a relaying socket 502 that fits the first plug 404, and the other end of cable 308 is connected to a hands-free microphone 304.

For the preferred embodiment in FIG. 7, the mobile telephone 110, the adapter body 400 and the adapter transmission cable 500 are all separable. With this design, the adapter 400 can be used not only for connecting to the adapter of a mobile telephone, but also can be used for connecting to the adapter of other audio equipment for playing other recorded media in the car. For example, for a car having a cassette recorder, the adapter body 400 can be pushed into the cassette deck, then the first plug 404 can be plugged into the adapter of either a compact disk (CD) or a mini disk (MD) player. Thereafter, recorded media such as CD or MD can be played out via the cassette recorder.

However, for the adapter body 400 configured like the one shown in FIG. 7, a preferred internal circuit structure is the one shown in FIG. 5C. This internal circuit structure is disclosed in Japanese Patent No. 62-120688. In this circuit, each channel has its own RC circuit serving as characteristic frequency balancing circuit for the left and right channel signals.

For a system with the plug 404 extending from the adapter body 400 already plugged into the socket 502 of the signal transmission cable 500, the remote voice signal can be transmitted from the hands-free telephone to the left signal line 306a or the right signal line 306c or to both the left and the right as shown in FIG. 5C. With this configuration, other frequencies beyond the bandpass filtering range may be broadcast from the loudspeakers. However, if the car audio system is equipped with an equalizer or related device, these high or low frequency noises can be filtered out.

The internal circuit structure in FIG. 5C can be similarly applied to the hands-free telephone system in FIG. 1. The circuit in FIG. 5A has a bandpass filter, while the circuit in FIG. 5C has a high cut filter. A changeover switch can be designed to sense the type of incoming signals. For voice signal, the signal should be lead to a bandpass filter as shown in FIG. 5A. If the incoming signal is an audio signal, the signal should be transferred to a high cut filter as shown in FIG. 5C.

Furthermore, this invention should not be restricted to the above embodiments. Other embodiments with variations can be included. For example, if the mobile telephone 100 does not have a voice input/output socket, a suitable adapter can be installed on the telephone to accept the plug 310 from the adapter cable 300 as shown in FIG. 1. Moreover, if the voice output terminal and its voice input terminal are separate, suitable plugs can also be employed to replace the single plug 310 indicated in FIG. 1.

In addition, although the above embodiments have been configured for connecting a mobile telephone to a car audio system, the described design can be equally applied for hooking up a mobile telephone to other home audio systems.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mobile telephone adapter system for use with an audio device having at least one loudspeaker, and a mobile telephone having a voice input and output terminal so that when the mobile telephone receives a remote voice signal, the remote voice signal will be output from the voice output terminal and through the loudspeaker, and so that a local voice signal can be transmitted to the voice input terminal of the mobile telephone for transmission by the mobile telephone, the mobile telephone adapter system comprising:

an adapter body for installation into the audio device;

a hands-free microphone;

a first signal transmission cable for connecting the adapter body and the mobile telephone; and a second signal transmission cable for connecting the hands-free microphone and the mobile telephone;

wherein the adapter body includes:

a housing shaped like an audio recording medium of the audio device;

a magnetic recording head installed inside the housing at a location for contact with a magnetic playback head of the broadcasting device, and having one end of the recording head connected to a first end of the first signal transmission cable;

a first terminal for linking a second end of the first signal transmission cable with the voice output terminal of the mobile telephone; and a second terminal for linking a second end of the second signal transmission cable with the voice input terminal of the mobile telephone.

2. The mobile telephone adapter of claim 1, wherein the voice output terminal and the voice input terminal of the mobile telephone includes a common ground line and a voice input/output socket for inputting and outputting voice messages, the first and second terminals are combined in a plug capable of insertion into the voice input/output socket, and the respective first and second signal transmission cables have one end joined together and connected to the plug.

3. The mobile telephone adapter of claim 1 or claim 2, wherein the first signal transmission cable includes a band-pass filter capable of filtering voice frequency band of the remote voice signal.

4. The mobile telephone adapter of claims 1,2 or 3, wherein the magnetic playback head of the audio device is a dual magnetic head capable of playing stereo audio signals, and a monaural sound of the remote voice signal can be produced when the magnetic recording head inside the housing is in contact with either side of the dual magnetic head.

5. The mobile telephone adapter of claim 4, wherein the magnetic recording head to contact with the first dual magnetic head of the audio device is a second dual magnetic head, and the signal from the first signal transmission cable can be switched to either side of the second dual magnetic head by an operational device on either the housing or the hands-free microphone, and by using linked operation of a selective switch with the operational device.

6. A mobile telephone adapter system for use with an audio device having at least one loudspeaker, and a mobile telephone having a voice input/output socket so that when the mobile telephone receives a remote voice signal, the remote voice signal passes from the voice input/output socket and through the loudspeaker, and so that a local voice signal can be transmitted to the voice input/output socket of the mobile telephone for transmission by the mobile telephone, the mobile telephone adapter system comprising:

an adapter body for installation into the audio device; and a signal transmission device connected to the adapter body;

wherein the adapter body includes:

a housing having a shape similar to an audio recording medium of the audio device;

a magnetic recording head inside the housing at a location for contact with a magnetic playback head of the audio device; and a signal relaying transmission cable having a first plug connected at one end to the magnetic recording head for sending the remote voice signal to the magnetic recording head;

wherein the signal transmission device connected to the adapter body includes:

a hands-free microphone;

a first signal transmission cable for connecting the adapter body and the mobile telephone; and a second signal transmission cable for connecting the hands-free microphone and the mobile telephone, one end of the second signal transmission cable coupling with the hands-free microphone;

wherein the first signal transmission cable has a relaying socket capable of receiving the first plug, and the other ends of the first and the second signal transmission cables are joined together and connected to a second plug that is insertable into the voice input/output socket of the mobile telephone.

7. The mobile telephone adapter of claim 6, wherein one end of the signal relaying transmission cable is coupled to the first signal transmission cable, one end of the hands-free microphone is coupled to the second signal transmission cable, and the other end of the first and the second signal transmission cables are joined together and connected to the second plug.

* * * * *